United States Patent [19]

Munter

[11] Patent Number: 5,499,239
[45] Date of Patent: Mar. 12, 1996

[54] LARGE CAPACITY MODULAR ATM SWITCH

[75] Inventor: Ernst A. Munter, Kanata, Canada

[73] Assignee: Northern Telecom Limited, Montreal, Canada

[21] Appl. No.: 422,240

[22] Filed: Apr. 14, 1995

[51] Int. Cl.⁶ .................................................. H04L 12/56
[52] U.S. Cl. ................ 370/60.1; 370/85.11; 340/825.79; 359/124; 359/139
[58] Field of Search ........................... 370/60, 60.1, 94.1, 370/94.2, 94.3, 85.9, 85.11; 340/825.03, 825.79, 825.8, 825.89; 359/117, 124, 128, 139

[56] References Cited

U.S. PATENT DOCUMENTS

| | | | |
|---|---|---|---|
| 4,956,839 | 9/1990 | Torii et al. | 370/60 |
| 5,016,245 | 5/1991 | Lobjinski et al. | 370/60 |
| 5,126,999 | 6/1992 | Munter et al. | 370/60 |
| 5,130,975 | 7/1992 | Akata | 370/60 |
| 5,157,654 | 10/1992 | Cisneros | 370/60 |
| 5,241,536 | 8/1993 | Grimble et al. | 370/60.1 |
| 5,268,896 | 12/1993 | Pauwels | 370/60 |
| 5,345,228 | 9/1994 | Franaszek et al. | 340/825.79 |
| 5,381,409 | 1/1995 | Folkert de Vries | 370/60 |

OTHER PUBLICATIONS

"A Scalable ATM Switching System Architecture" by W. Fischer et al., IEEE Journal on Selected Areas in Communications, vol. 9, No. 8, Oct. 1991, pp. 1299–1307.

*Primary Examiner*—Hassan Kizou
*Attorney, Agent, or Firm*—Yoshiharu Toyooka

[57] ABSTRACT

A large capacity ATM switch is constructed in a matrix of a plurality of modules which are connected by high speed buses. Each module includes an I/O port for external access to the switch. Data are exchanged between I/O ports in trains of continuous ATM cells of any arbitrary number. Prior to transmission of data, a connection between destination and source I/O ports is made by exchanging a connection request and connection grant signal through control buses.

21 Claims, 11 Drawing Sheets

Total Buffer Throughput=100+38+38=176%
Bus Capacities: 38+38+19=95% (H), 38+38+4=80% (V)

LARGE CAPACITY MODULAR ATM SWITCH

FIELD OF THE INVENTION

The invention relates generally to large capacity ATM switches. In particular, it is directed to ATM switches in which a plurality of modules containing buffers and input/output (I/O) ports are arranged in a logical matrix. ATM cells are exchanged among I/O ports in a train of one or more cells through the buffers and/or high speed buses in response to connection control signals.

BACKGROUND OF THE INVENTION

High capacity fiber transmission already provides the technical means to move very large amounts of data from node to node at reasonable cost. Broadband access systems are based on systems such as fiber to the home, fiber to the curb, coaxial cable, or wireless, and will serve to connect subscribers to local access nodes. As the number of asynchronous transfer mode (ATM) broadband subscribers grows, and total network traffic volume increases, the construction of an efficient access and tandem network will require very large ATM switches with aggregate capacities in the 100's to 1000's of gigabits per second (Gbit/s).

Innovations in network architecture may lead to a more distributed network of a larger number of smaller nodes, but the geographic clustering of traffic in cities and communities, the shrinking cost of collecting a large bandwidth over ring, tree, or star access networks, and the operational economics of fewer, larger sites is likely to continue to favor the concentration of traffic into exchanges serving 10,000 to 100,000 subscribers. Similarly, fewer but larger tandem switches will be more economical. Local and tandem exchanges capable of switching 5,000 to 80,000 Erlang of voice traffic are already common today. Extending from this existing telephone network capacity and assuming that traffic patterns and communities of interest do not change substantially, a simple estimate of switch sizes would be 0.4 to 5 Gbit/s at 64 kbit/s.

Traffic demand and average bit rates of terminals in the broadband network are less predictable. Average peak hour demand may range from a few 100 kbit/s to 10 Mbit/s or more per subscriber, depending upon the offered service. For example, digital video-on-demand, using MPEG2, could easily generate a network demand of 5 or 10 Mbit/s per household (the bottleneck in this scenario appears to be the video server capacity).

It would require a gross switching capacity of one Terabit/s to handle the aggregate demand of a 100,000 subscriber head end switch. Similarly, millions of already existing home computers could transfer data over a broadband network at peak rates well in excess of 10 Mbit/s, if such a network were offered economically.

Today, ATM switches which address both the data and the evolving multi-media market are being offered. These switches have capacities ranging from less than 600 Mbit/s to a few 10's of Gbit/s. The task of switching much larger amounts of point to multi-point or point-to-point traffic efficiently will have to be solved in future.

In U.S. Pat. No. 5,126,999, issued Jun. 30, 1992 (Munter et al), an ATM switch is described in which output segregated input buffers are operated on real-time by crosspoint selection circuits implementing a combined buffer fill/age algorithm.

In U.S. Pat. No. 5,241,536, issued Aug. 31, 1993 (Grimble et al), a timeslot utilization means is provided in an ATM switch for scheduling the earliest possible connection between an input port and output ports.

In U.S. Pat. No. 5,130,975, issued Jul. 14, 1992 (Akata), a timeslot scheduling unit in an ATM switch prevents the packets from collision in a space division switching unit. Each packet buffer unit at each port writes packets sequentially but reads out randomly in the timeslots assigned by the timeslot scheduling unit so that the throughput of the space division switching unit is improved.

In U.S. Pat. No. 5,157,654, issued Oct. 20, 1992 (Cisneros), a contention resolution technique for a large ATM switch is described. It utilizes cell address look-ahead in conjunction with parallel planes of self-routing cross-points, staggered time phased contention resolution and shared memory based input and output modules.

In U.S. Pat. No. 4,956,839, issued Sep. 11, 1990 (Torii et al), an ATM switch includes ATM line terminating units and a self-routing space switch.

In the applicant's co-pending application Ser. No. 08/352,405 filed on Dec. 8, 1994, the disclosure of which is hereby incorporated herein by reference, a large capacity ATM switch is described. The switch is based loosely on a space switch crosspoint, input and output buffers and substantially high speed links connecting them. A connection is set up between buffers by an exchange of connection control signals and trains of ATM cells are transmitted in bursts. A combination of high speed links and transmission of cells in bursts achieves high capacity switching with relatively low speed control signals.

It is desirable that a switch not only possess a large capacity but can also grow smoothly in capacity to its maximum, for example over a range from perhaps 50 up to 1000 Gbs and more. Such smooth expandability is the main stumbling block for practically all possible architectures. In terms of product and market requirements, the cost-per-port curve should be flat over the range expected to be used widely. In terms of physical realities, a switch inherently has a non-linear growth curve, a combination of a constant cost-per-port of the external I/O components, a logarithmic (theoretical best case) to square law characteristic for the switch core function, and a potentially square or higher law property in the switch control function.

In an article entitled "A Scalable ATM Switching System Architecture" by Fischer et al in IEEE Journal on Selected Areas in Communications Vol. 9, No. 8, Oct. 1991 pp 1299–1307, an ATM switching module is described. The article further discusses schemes using the modules to expand capacity in terms of the number of ports without service interruption.

The architecture according to the present invention employs a novel modular construction which makes use of high speed buses and buffers. The inventive modular construction take advantage of a burst switching mechanism similar to that described in applicant's above-referenced co-pending application.

OBJECTS OF THE INVENTION

It is therefore an object of the invention to provide a large capacity ATM switch in which a plurality of modules are arranged in a logical matrix.

It is another object of the invention to provide a large capacity ATM switch of modular construction so that the capacity of the switch is smoothly expandable.

It is a further object of the invention to provide a large capacity ATM switch which makes use of high speed data buses but relatively low speed control buses.

SUMMARY OF THE INVENTION

Briefly stated, according to one aspect of the invention, a large capacity modular ATM switch for exchanging data in ATM cells among I/O ports comprises a plurality of switching modules arranged in a logical m×n matrix, m and n being positive integers, each switching module having an I/O port, a buffer, bus selector means and a control circuit. The switch also includes H data buses separately connecting modules in each separate row of the matrix to send data to all the modules in each row and V data buses separately connecting modules in each separate column of the matrix to send data to all the modules in each column. Further H and V control buses are provided, connecting modules in rows and columns to exchange control signals among the module control circuits. The bus selector means of each module is connected to the H and V data buses for selectively receiving data therefrom in response to the control signals on the H and V control buses and the buffer is connected to both data buses for storing one or more ATM cells in transit between the I/O ports. The control circuits generate the control signals in response to the state of the buffer.

According to another aspect, a large capacity modular ATM switch for exchanging data in ATM cells among I/O ports comprises a plurality of switching modules arranged in a logical m×n matrix, m and n being positive integers, each switching module having an I/O port, a buffer, bus selector means and a control circuit. The switch includes H data buses separately connecting modules in each separate row of the matrix to send data to all the modules in each row. It also includes V and W data buses, each separately connecting modules in each separate column of the matrix to send data to all the modules in each column. The switch further comprises H, V and W control buses connecting modules in rows and columns to exchange control signals among the module control circuits. The bus selector means of each module is connected to H, V and W data buses for selectively receiving data therefrom in response to the control signals on the H, V and W control buses. The buffer is connected to the data buses for storing one or more ATM cells in transit between the I/O ports. The control circuits generate the control signals in response to the state of the buffer.

According to yet another embodiment, the V and W data buses are combined into a single bus with an increased capacity and a partitioned memory for buffers.

BRIEF DESCRIPTION OF THE DRAWINGS

The invention will be further understood from the following description with reference to the accompanying drawings, in which.

DETAILED DESCRIPTION OF THE PREFERRED EMBODIMENTS OF THE INVENTION

For telecommunications switches, a single-stage architecture is desirable from the point of view of performance and predictability. It has, however, been difficult to make a single-stage architecture modular and expandable over a meaningful range.

Traditional architectures such as input-buffered crosspoint, output buffered bus, or common memory, can all be extrapolated to very large sizes. A ring of add-and-drop nodes can be thought of as either an input or output buffered bus. Modularity remains a big issue with these systems.

The basic technology requirements for building a single stage Terabit capacity common memory switch are fairly easy to derive. For example, at 1 Tbs of net payload, ATM cells arrive at the rate of 2.36 Giga Cells/sec., (53 bytes in an ATM cell) and therefore a memory access time for read or write of about 400 psec. is required to build a "standard" common memory core. The amount of memory required depends on the link rates and the overall performance requirements (loss, priorities), but would probably not exceed 10 to 40,000 cells (or 0.5 to 2 MB). Considering the alternatives which may require 30 or 40 cabinets of lower capacity switches interconnected in multiple stages, this is not a large amount of memory but the memory access must run extremely fast. The required speed appears unrealizable at the present.

It is possible to build a switch which functions as a single-stage system of very high speed RAM by using a plurality of lower speed devices arranged in a square array. For every reduction in speed by 2, four times as much RAM is required. Thus, if the memory speed is brought down by 8, the required speed of 400 psec. becomes 3.2 nsec., which is a possible speed to build with the present technology. The slowdown by 8 needs 64 times as much actual memory, i.e. 32 to 128 MBytes. For comparison, a multi-stage switch of similar capacity would require about 20 to 40 MBytes of 5 nsec. memory, at the expense of a large physical size and more complex control mechanisms.

The scheduler of a common memory switch must run at the same or significantly higher speed, depending on various design choices. However, just as data RAM can be matrixed, so can the scheduler be distributed. In fact, the real switching action occurs in the scheduler, and a number of architectures are plausible for distributing the scheduler task. However, all such distributed scheduler schemes result in less efficient data RAM utilization and require more data RAM for comparable performance.

Distributing the data RAM and scheduler functions into multiple hardware units only makes sense if it also provides a means for growth, or sub-equipping. A rectangular or square packaging arrangement which distributes all functions, including port I/O, in a matrix arrangement gives such a means.

Figure 1:
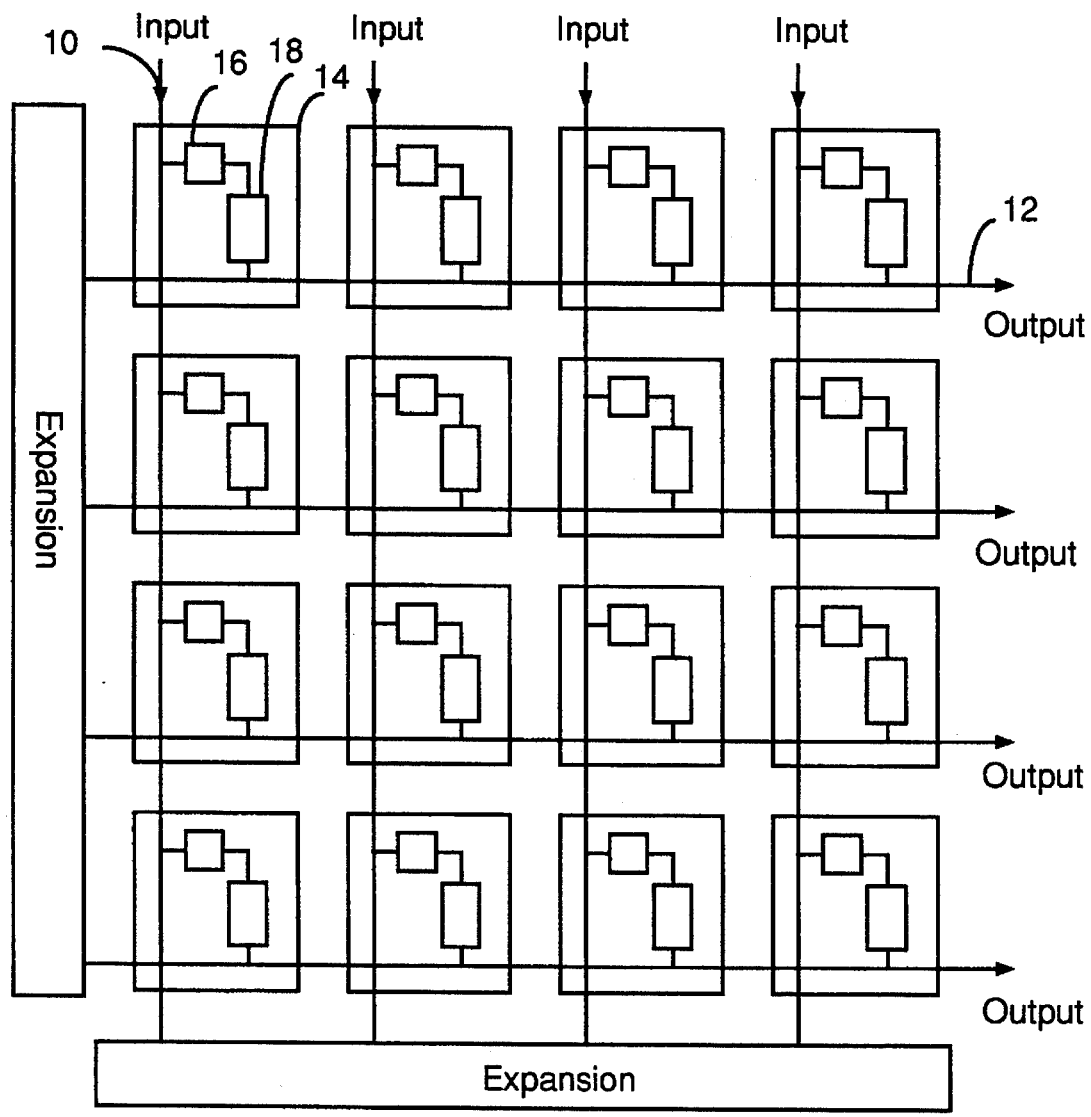
FIG. 1 is a known ATM matrix switch.

FIG. 1 shows a known matrix switch for ATM. In the figure, only four input ports 10 and output ports 12 are shown for illustration purposes. A crosspoint node 14 at each intersection of input and output buses includes an address reader 16 and a buffer 18. When a crosspoint node sees a cell addressed to the output port to which it is connected, it stores the cell in its buffer and waits for access to the output bus. An arbitration is performed among buffers of nodes on an output bus. As the switch operates one ATM cell per cycle, the arbitration must work very fast for a fast switch. As shown in the figure, this switch can only grow in large chunks (e.g. a row at a time), and has fundamentally a N-squared growth characteristic which can be softened by building some of the future growth into each provisionable unit. Of course, this hurts the lowest capacity stage most and therefore a large capacity matrix switch also requires a large number of crosspoint nodes. The buffers must be large in memory size to avoid cell loss under peak load but are used very little on the average.

The present invention also uses a rectangular or square arrangement of modules but permits expansion by any number of modules at a time. The switch can grow to a large capacity switch with relatively slow connection control speed. It also makes very efficient use of buffers.

Figure 2:
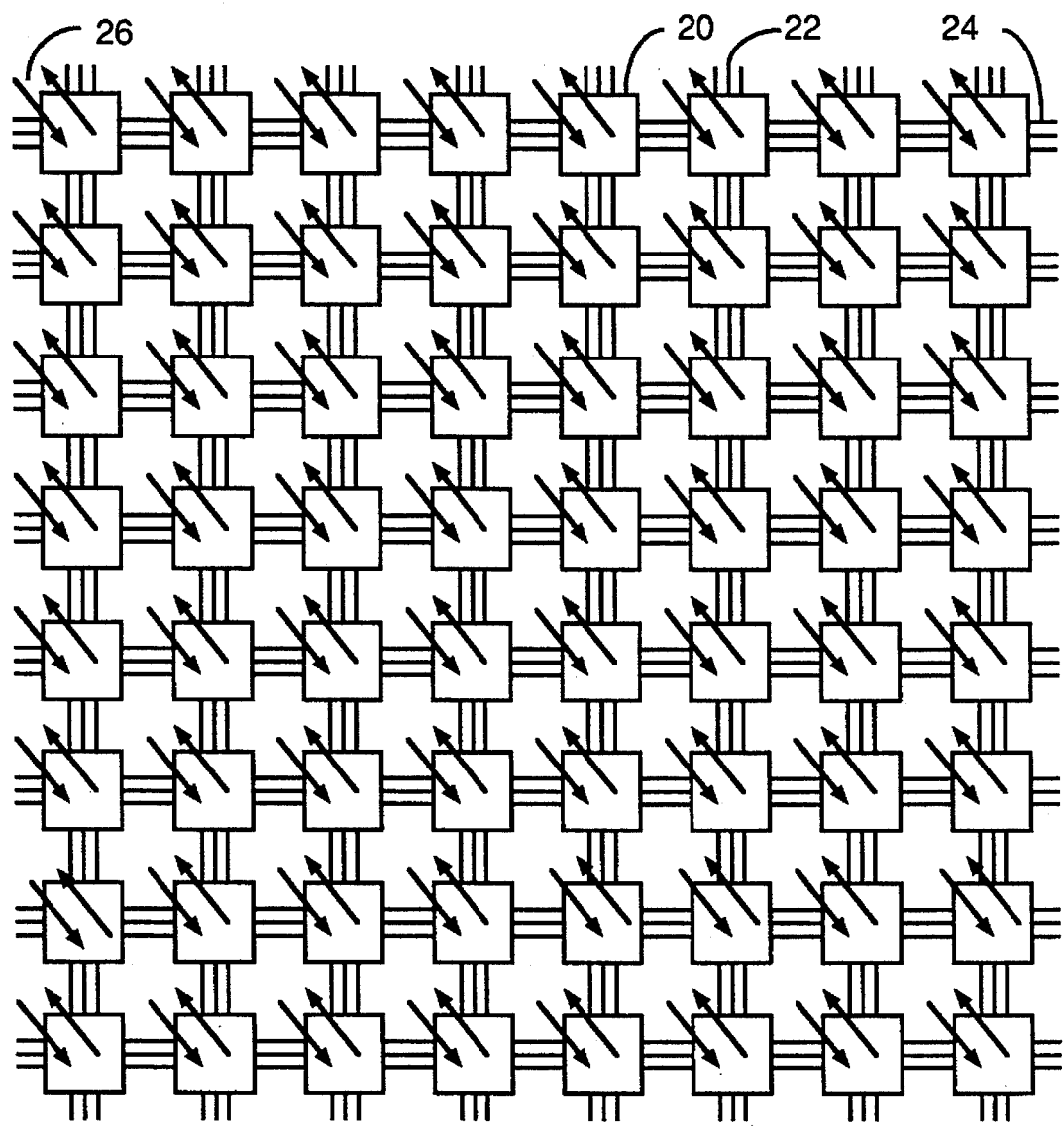
FIG. 2 shows a concept of a matrix switch according to the invention.

FIG. 2 is a conceptual diagram of the large capacity ATM switch (1 Terabit per second) of the invention designed in the architecture similar to FIG. 1. In this architecture, I/Os are distributed and traffic is multiplexed directly on the buses instead of in separate multiplexer stages. A matrix of 8×8 switch blocks 20 are connected by vertical and horizontal buses 22 and 24. Each switch block has a nominal 16 Gbs capacity and thus the whole system provides the 1 Tbs maximum capacity. Each switch block is responsible for buffering all the cells that are switched between its associated input and output buses, as well as for 16 Gbs worth of external I/O ports 26. Each vertical slice carries 128 Gbs worth of input traffic, each horizontal slice the same amount of output traffic, in the form of 8 buses of 16 Gbs each, or equivalently more signals at lower speed. Once cell expansion with routing tags, CRCs etc. is taken into consideration for internal use, 16 Gbs net may become 20 Gbs gross. Each crosspoint block couples its input traffic from the I/O port into one of the vertical buses, and collects traffic destined for its associated output port from all the intersecting horizontal buses, one traffic at a time. The figure shows an 8×8 matrix switch but of course a rectangular matrix of m×n is possible. It goes without saying that the matrix is a logical one and not a literal one, and that the horizontal and vertical busses or the column and row of the matrix can be interchanged. It should also be noted that all the crosspoints do not have to be filled with switches.

The system of FIG. 2 would work in a straight-forward manner at a capacity of 1 Tbs, and would behave as a true single stage switch, if each crosspoint switch block was a switch of 160 Gbs (8 buses of 20 Gbs each) capacity. Then there will be no advantages to be realized in arranging that many high capacity switches (64 switches of 160 Gbs each).

Figure 3:
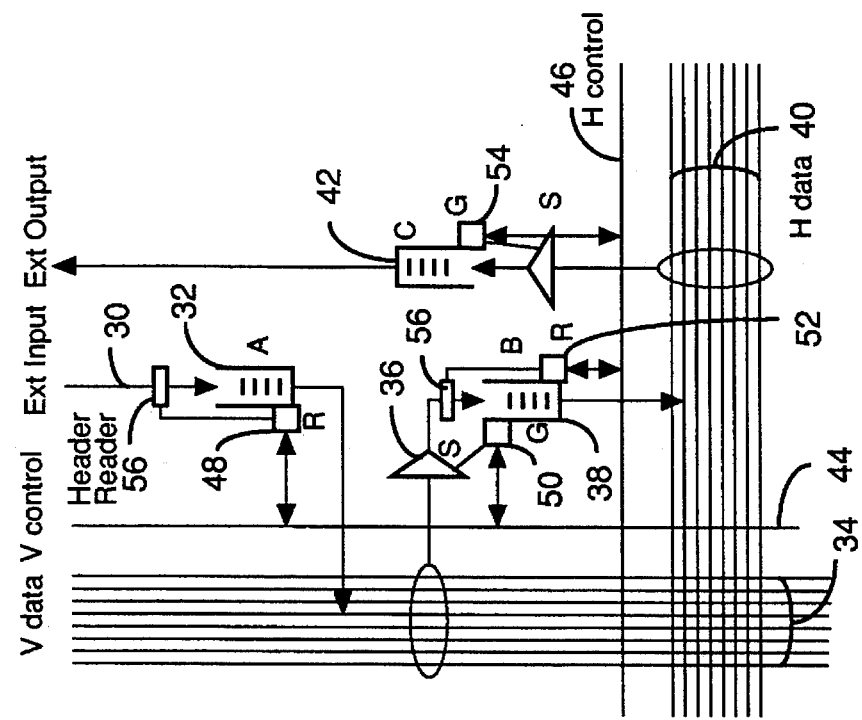
FIG. 3 is a schematic illustration of a crosspoint module of the matrix switch according to one embodiment of the invention.

FIG. 3 is a functional schematic of a crosspoint node (switching module) in an 8×8 matrix switch according to one embodiment of the invention shown in FIG. 2. Unlike the conventional matrix switch of FIG. 1, this crosspoint node makes more efficient use of buffer memory and can grow smoothly, one module at a time. The node contains three buffer elements and two 8:1 bus selector circuits. All data paths run at a speed of 20 Gbs. All three buffers have a 20 Gbs input and output capability (which translates loosely to 20 nsec. memories, that is to say, the 20 Gbs speed with 512 bit cells corresponds roughly to 25.6 nsec for a memory cycle of read and write). The 20 Gbs input port 30 drives straight into buffer A32 which receives all cells. The output of buffer A32 drives one of the 8 vertical bus lines collectively called V data bus 34. One line is driven by each node in a vertical slice, all 8 are readable by an 8:1 bus selector circuit 36, so that one can be selected as input to buffer B38. Buffer B38 receives (in round robin fashion or on demand) traffic from all 8 vertical bus lines, which is directed to any of the other ports in the same horizontal slice. The output of buffer B38 has exclusive drive access to one of 8 horizontal bus lines called H data bus 40. Buffer C42 receives data from any of the 8 horizontal bus lines, selected one at a time. The figure also shows V and H control buses 44 and 46 and their signal means 48, 50, 52, and 54 (which may be collectively called a control circuit), all of which will be described in more detail later. The control circuit is of course driven by the header of ATM cells, which is read at header readers 56.

Figure 4:
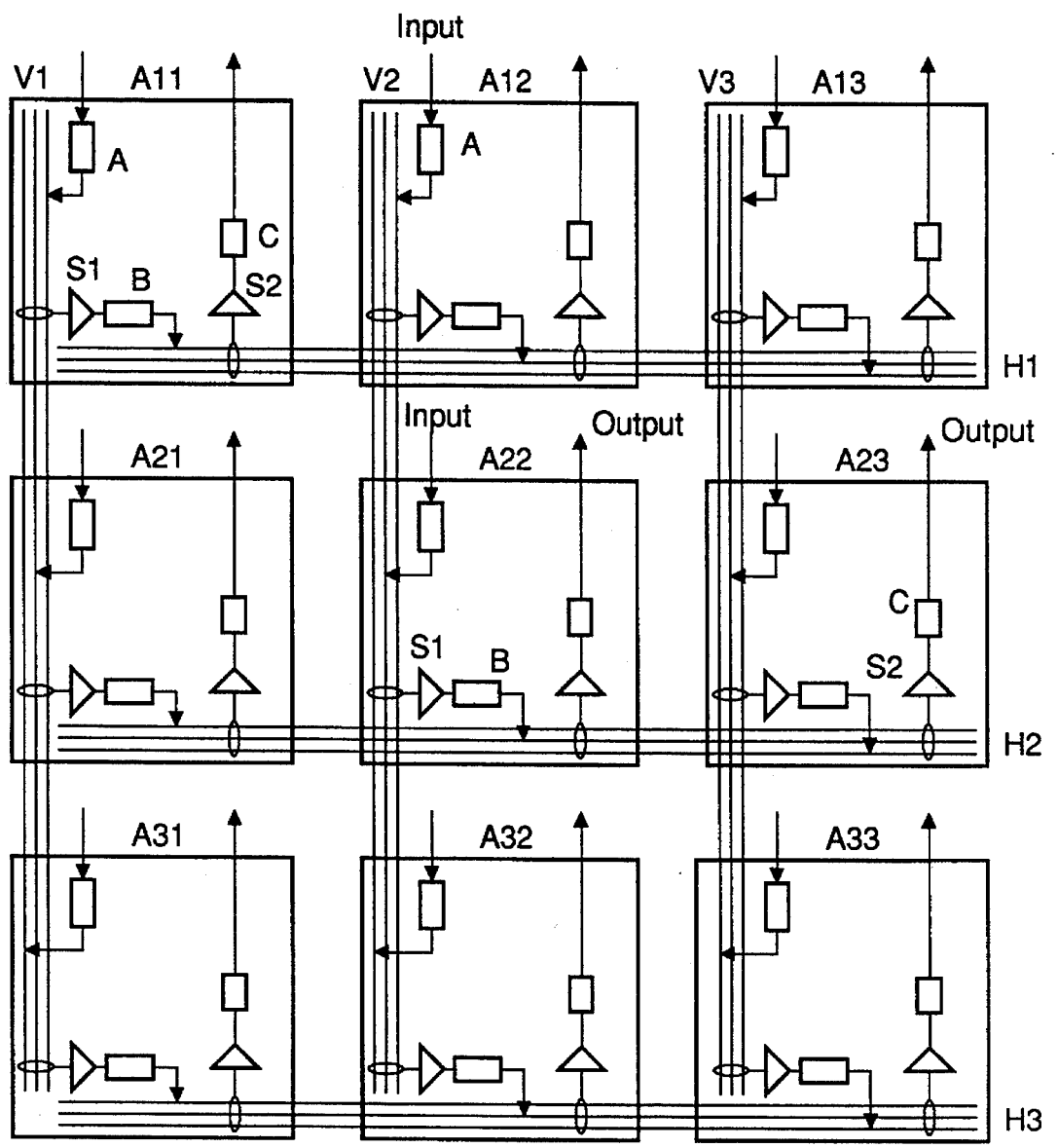
FIG. 4 is a functional illustration of a 3×3 matrix switch according to the embodiment of the invention.

FIG. 4 is a matrix switch which contains only 9 crosspoint nodes (switching modules) A11, A12, . . . , A32, A33 in a 3×3 matrix configuration for ease of illustration and understanding, instead of the actual model of 64 nodes in an 8×8 matrix configuration. There are two groups of buses, V buses and H buses. Only data buses are shown. Each group of buses is made up of three buses V1–V3 and H1–H3, each bus in turn being made up of three bus lines. Buffers A, B and C are also shown. A 8×8 matrix configuration requires that V and H bus groups are each made up of 8 buses, each of which in turn consist of 8 bus lines.

The cell enters the matrix from "input" through the I/O-port of, for example, module A12. Here it is buffered in buffer A and enters the vertical bus V2. Buffer A of module A12 only drives one bus line of bus V2. All the modules in the column are served by bus V2 and when the bus selector circuit S1 of a module in the column is instructed by the control circuit of the same module that cells addressed to it are present on one of the bus lines of V2, it picks them up. Thus at module A22, the cells are taken off the V bus, buffered in buffer B, and enter the horizontal bus H2. As with V2, bus H2 is also made up of three bus lines and when the bus selector circuit S2 of a module in the row is instructed by the control circuit that cells addressed to it are present on one of the lines of H2, it collects them to store in buffer C. At module A23, therefore, the cells are taken off the H2 and sent to "output" through buffer C and the I/O-port of module A23. The actual switching action occurs at the bus selector circuit S1 of module A22 and S2 of module A23. The purpose of buffers A and B is to allow cells to wait until the receiving selector can be switched to receive to the particular bus line on which the cell will arrive. Buffer C, on the other hand, is simply a FIFO functioning as a rate adaptor and permits the I/O port to match or resynchronize the speed of peripheral devices.

The switch configuration illustrated in FIGS. 2–4 is more efficient than the conventional matrix switch shown in FIG. 1 and works well if the traffic among its ports is balanced. Unbalanced traffic may cause some blocking, as will be illustrated in FIG. 4. Referring to FIG. 4, while a connection from A12 to A23 is being held, such connections as those from A22 to A21, A32 to A22, A32 to A21, and A22(in) to A22(out) cannot be completed because the H2 bus from A22 to other modules in the same row is busy.

Figure 5:
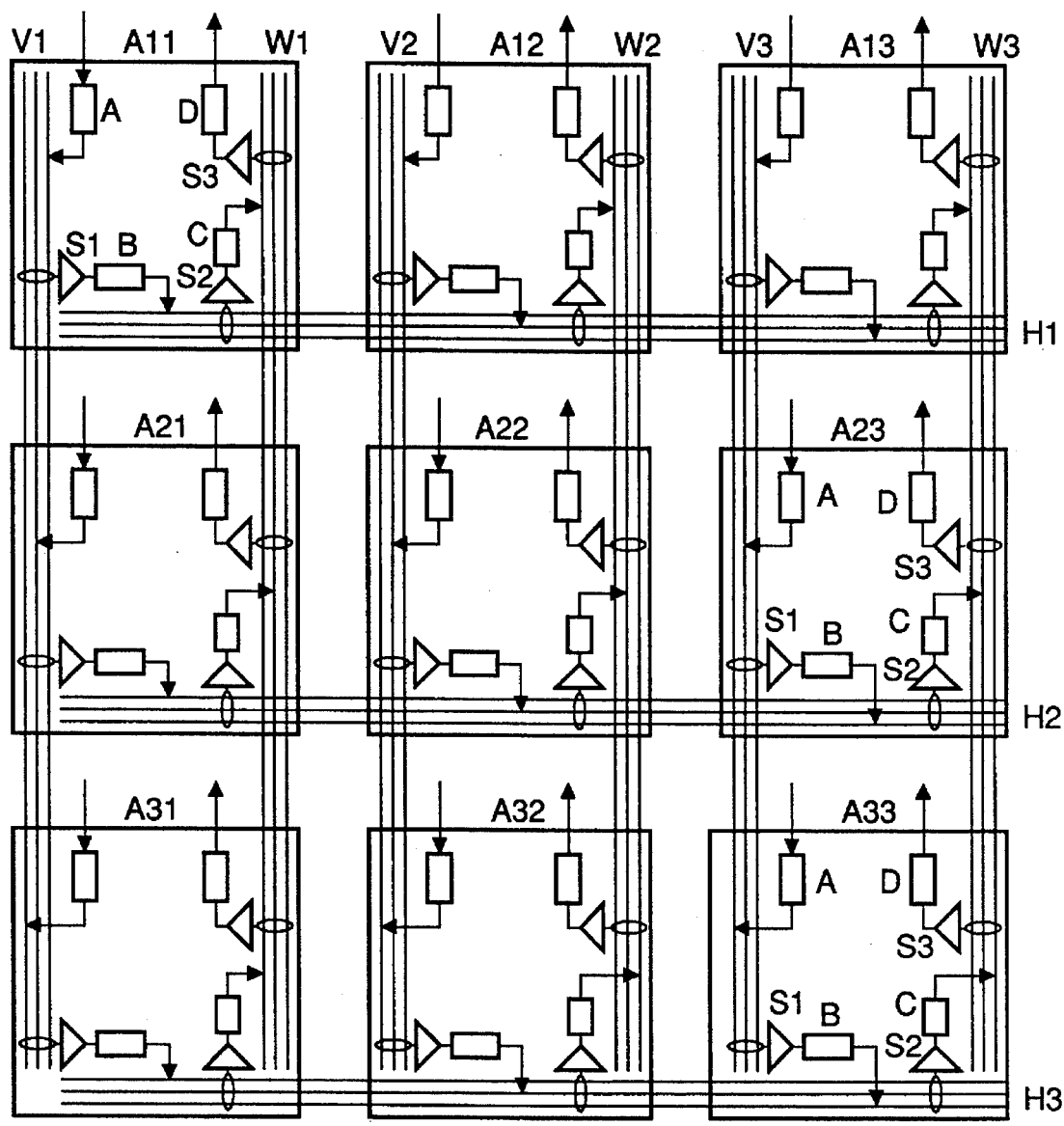
FIG. 5 is a functional illustration of a 3×3 matrix switch according to another embodiment of the invention.

FIG. 5 shows another embodiment which solves this problem and further improves performance. This figure, like FIG. 4, contains only 9 modules in a 3×3 matrix for ease of illustration. The embodiment contains a third switching stage in the form of another group of buses (called W buses), a bus selector circuit S3 and a buffer D. The W buses are also made up of three buses W1–W3, each of which consists of three bus lines. The W buses and the combination of a simple resynchronization buffer D and a bus selector solves the problem discussed above. For example, referring to the figure, a connection from A12 to A23 follows the same path as that in FIG. 4 except that it goes through one more bus W, a bus selector S3 and buffer D of module A23. While H2 from A22 is busy, a new connection from A22 to A21 can be routed through V2, H3 and W1, involving modules A22, A32, A31 and A21.

Figure 6:
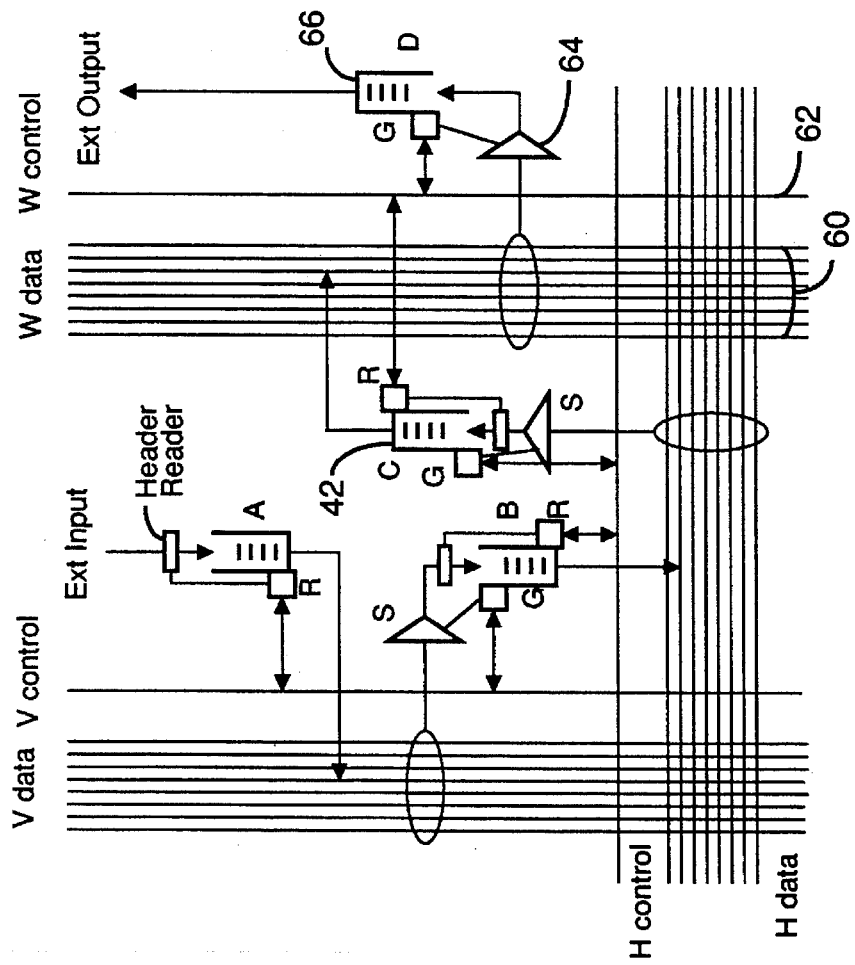
FIG. 6 is a schematic illustration of a crosspoint module used in the matrix switch of the embodiment of FIG. 5.

FIG. 6 is a more detailed illustration of one crosspoint module of an 8×8 matrix configuration according to the embodiment of FIG. 5. In addition to those shown in FIG. 3, FIG. 6 shows a third group of data and control buses, called W data buses 60 and W control buses 62, together with associated bus selector circuits 64 and buffers D66. Thus, buffer C42 drives one of the W bus lines and the bus selector circuit 64 picks up cells from a chosen bus line to buffer D66. The buffers are shown as simple FIFO buffers but in reality buffers A, B and C would have some internal structure (multiple virtual FIFOs) in order to avoid head of line blocking. Furthermore, to regulate and coordinate traffic among the buffers through the buses, a buffer control mechanism is needed and will be described in more detail below. Therefore, in addition to V, H and W buses, separate V, H and W control buses and their signals are shown.

Figure 7:
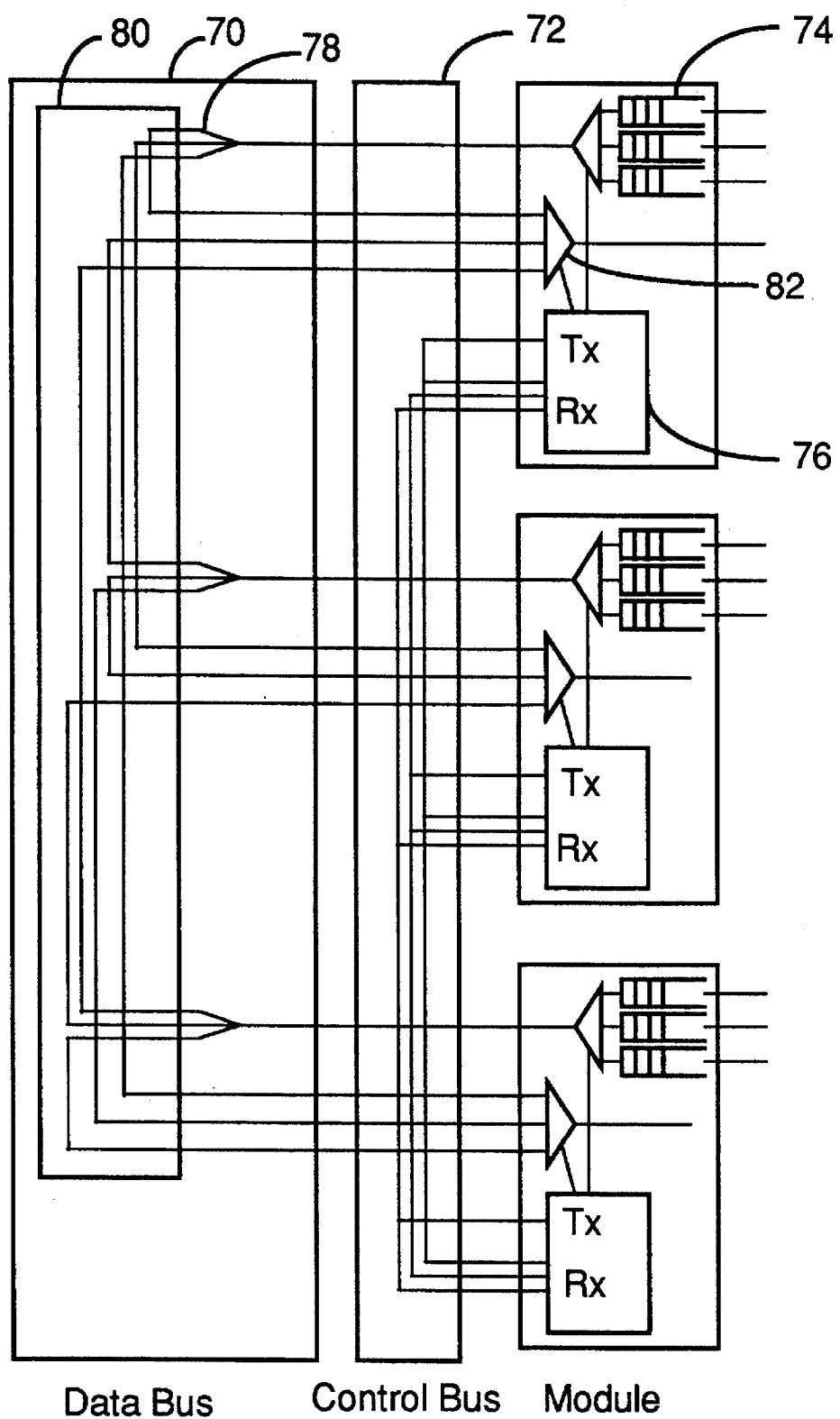
FIG. 7 is a functional illustration of buses and modules in one column.

FIG. 7 shows modules in one column together with V data buses 70 and V control buses 72. A similar illustration can be made involving any of V, H and W buses. Referring to FIG. 7, each buffer 74 in each module is equipped with a control circuit 76 which contains one or two basic functions, a request function (R), and a grant function (G). The control circuits communicate along either a vertical or horizontal control bus. In a 3 by 3 matrix switch, there are 3 vertical and 3 horizontal control buses which operate completely independently. The figure shows the control circuit having Tx and Rx for issuing and receiving request and grant signals for respective functions addressed to modules in the same column. The bus structure described thus far can be implemented electronically, optically or a mixture of both. The aforementioned applicant's co-pending patent application teaches an optoelectronic implementation and a similar arrangement can be used in the present invention in which the data bus includes a bundle of fiber optics, optical splitters 78 and an optical shuffle 80. An optical selector 82 chooses one of three fiber optics in a bundle in response to the grant signal from the control circuit.

The switching algorithm is similar to that described in detail in the above-referenced application. When there is at least one cell to send in its buffer A, a controller of a connection-originating crosspoint module generates a request for connection through the control bus to a second module on the same V bus. In response, the controller of the second module issues a grant back. Since some short time periods will, in general, pass between each request and the corresponding grant, more than one cell will typically have accumulated in the buffer. When a requested connection is eventually made, all accumulated cells for the second module are sent in a single burst of a plurality of cells before the connection is released again. The second module receives the burst of cells in its buffer B and then issues a request for connection to the third module on the same H bus. A similar process is performed from the third module to the fourth module on the W bus to eventually an external output of the fourth module. The cell traffic flows over high speed (20 Gbs) links while the control exchanges occur at a much lower rate, typically over links running at 100 Mbs or so.

Figure 8:
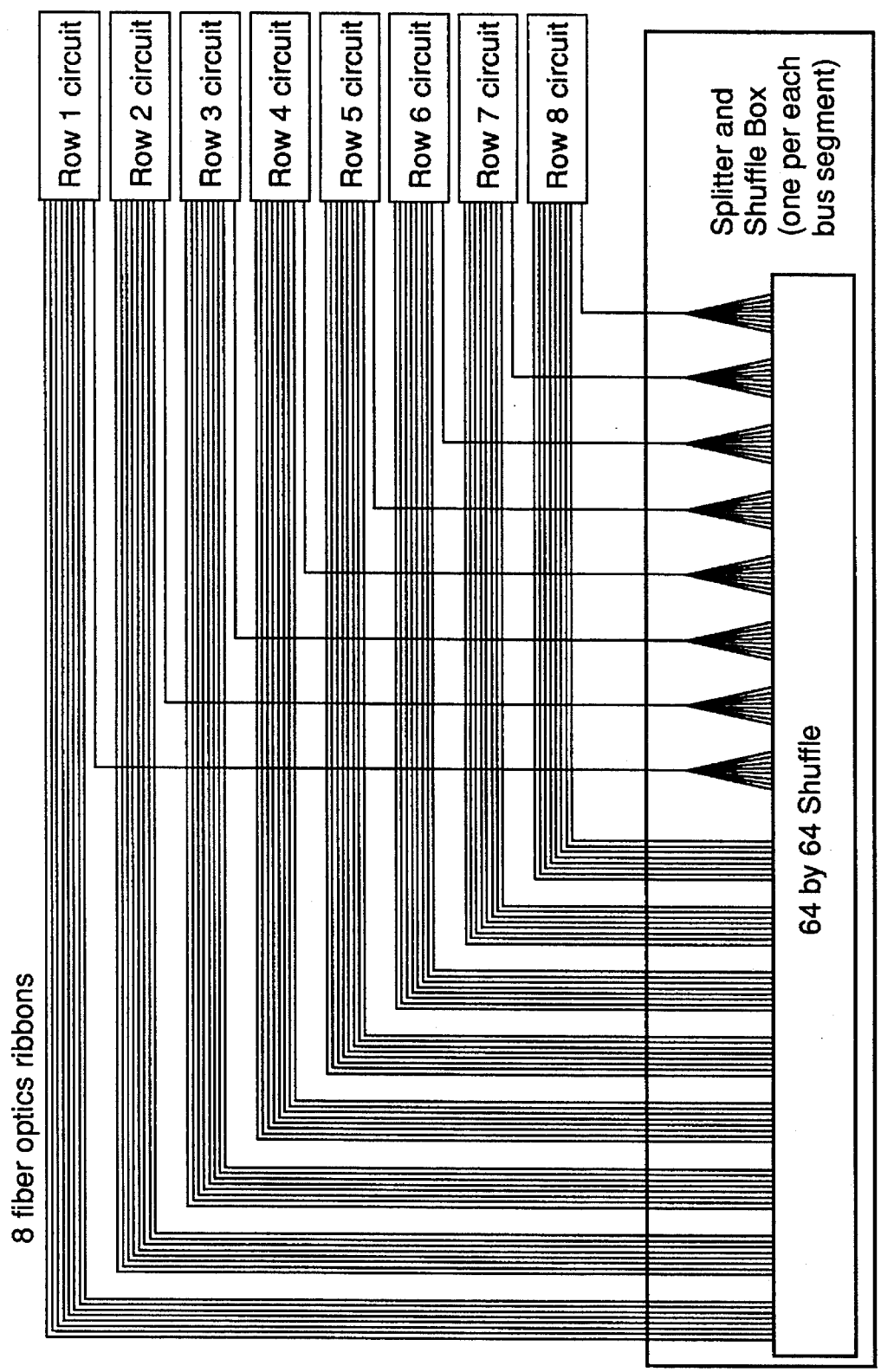
FIG. 8 is a diagram showing the optical distribution.

FIG. 8 shows an optical fiber distribution for an 8×8 matrix optical crosspoint switch according to one embodiment. In the figure, a signal from one module is split by an optical splitter into 8 parts which are distributed to all 8 modules in a row or column by a fiber optic ribbon containing 8 single fiber optics. Eight fiber optic ribbons and 8 optical splitters are connected through a 64×64 optical shuffle, forming one bus.

Figure 10:
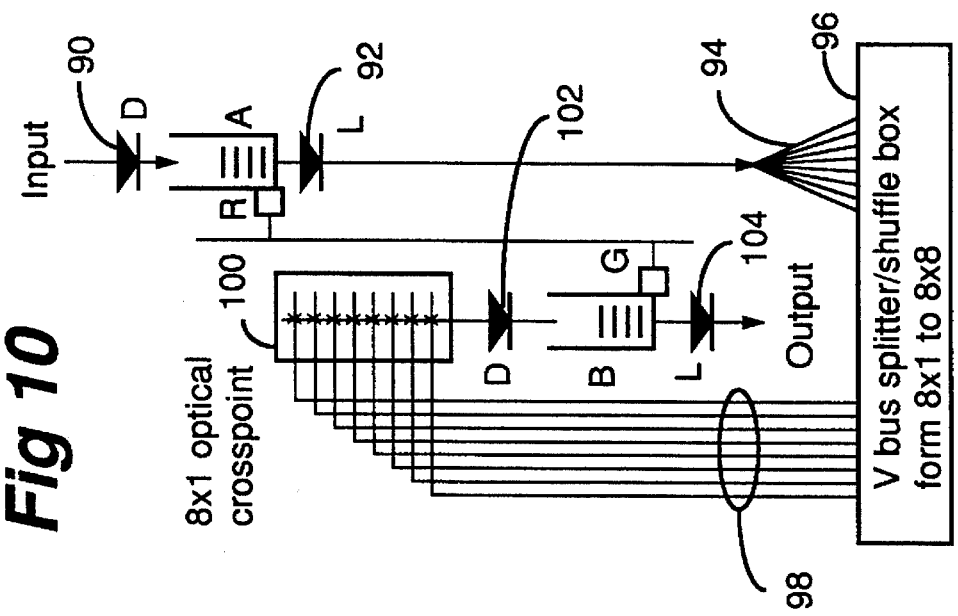
FIG. 10 is a schematic illustration of one implementation of the optical selector mechanism shown in FIG. 8.
Figure 9:
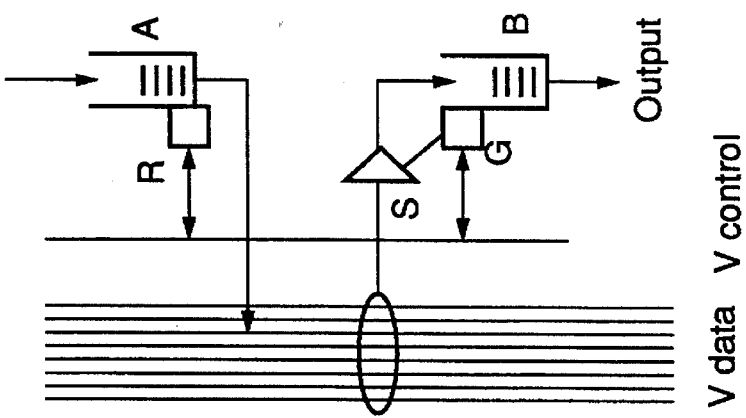
FIG. 9 is a functional illustration of an optical selector mechanism.

FIGS. 9 and 10 are functionally equivalent illustrations of an optical bus selector according to one embodiment of the invention. In aid of understanding, FIG. 9 (a functional diagram) and FIG. 10 (its electro/optical implementation in schematic) are arranged side-by-side. An input optical signal is converted to an electrical signal by a detector 90 and is then buffered, e.g. at buffer A whose output is converted back to an optical signal by a laser 92. The optical signal is sent to all eight modules in a column through an optical splitter 94 and an optical shuffle 96. Each fiber optic in a bundle 98 is driven by each of eight modules in a column. The bundle is fed to an 8:1 optical crosspoint circuit 100 which, in response to a control signal, selects one of eight fiber optics to feed buffer B after proper conversion to and from an electrical signal by a detector 102. Laser 104 couples the output of buffer B to a second bus, or the I/O port.

Figure 11:
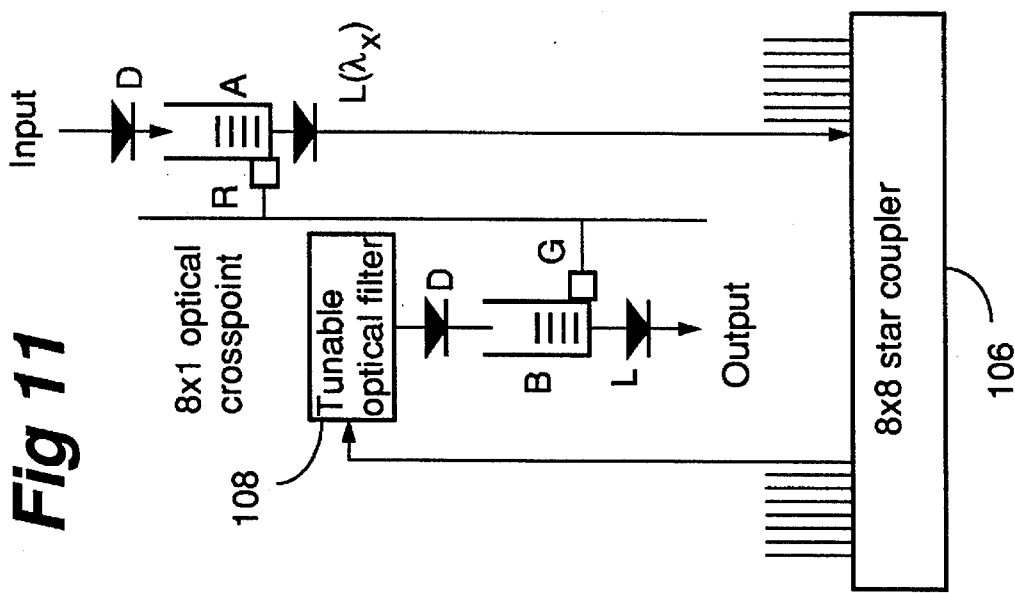
FIG. 11 is a schematic illustration of another implementation of the optical selector mechanism shown in FIG. 8.

FIG. 11 is an illustration of another implementation of the bus selection circuit functionally shown in FIG. 9. This embodiment uses WDM (wavelength division multiplexing). An input signal is multiplexed into a beam containing one of eight wavelengths and an 8×8 star coupler 106 combines eight signals at input to eight signals at output, each of which now contains all eight wavelengths representing the sum of all eight sources. These are passed through an optical selector 108 such as a tunable optical filter to select one out of eight signals to input to a buffer. Applicant's co-pending application Ser. No. 08/322,140 filed on Oct. 13, 1994 describes optical WDM devices which can be used for this purpose.

Generally speaking, a signal to be switched from the external input to any external output travels through four matrix nodes. The path of the signal thus involves 4 buffers and 3 buses as shown in FIG. 5. Because the access speed of each buffer is matched to one bus, four buffers can be combined into one.

Figure 12:
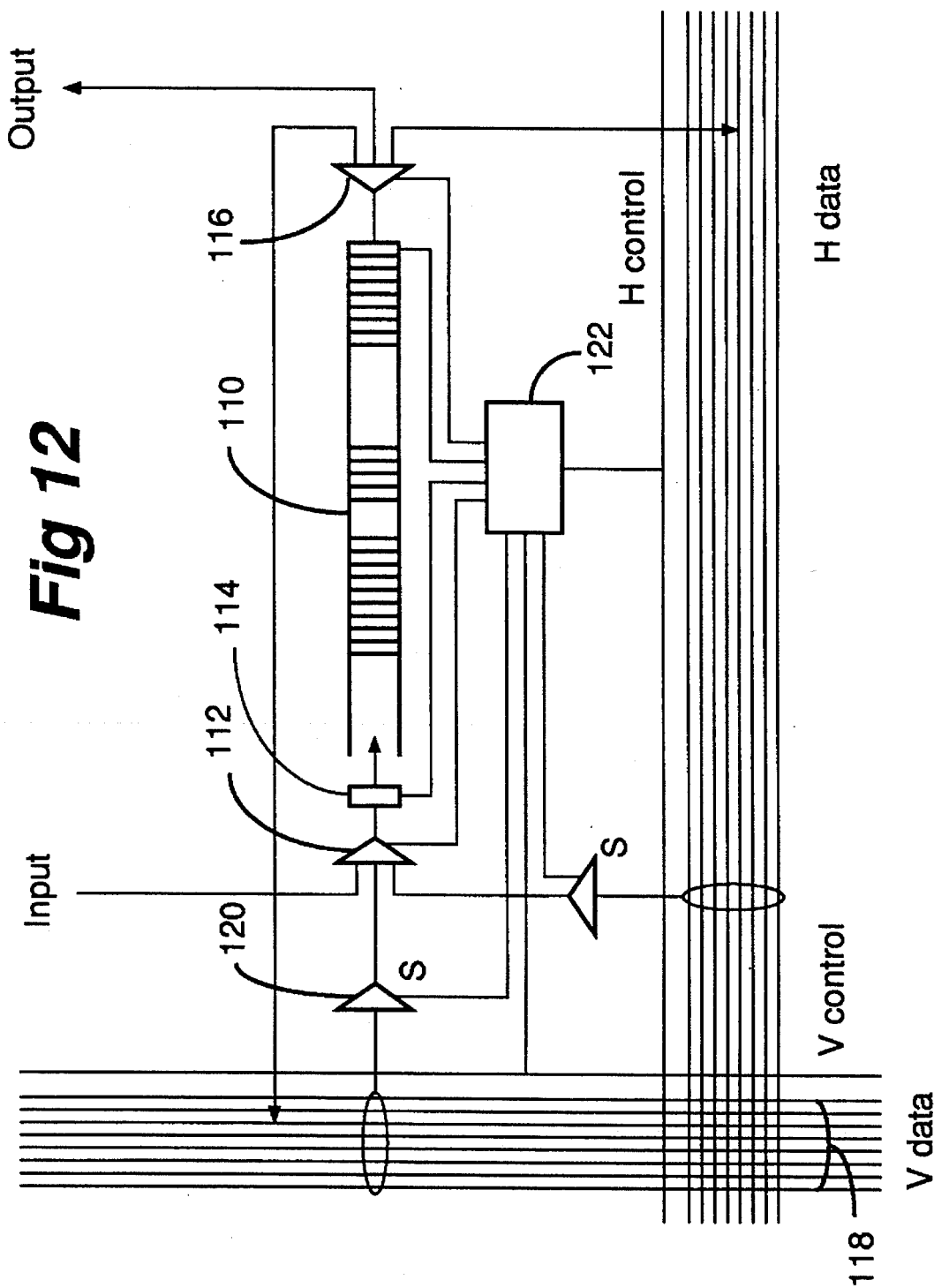
FIG. 12 is a buffer mechanism according to a different embodiment of the invention.

FIG. 12 shows an embodiment in which four buffers are combined into a single unit 110. All buffer input signals are multiplexed together by a multiplexer 112 and the headers of cells are read at the header reader 114 before being stored in the buffer. The buffer output is demultiplexed to each bus at a demultiplexer 116 and to the external output. V data buses 118 combine the functions of the previous V and W data buses shown in FIG. 5 and run at double the speed, or alternatively double the bandwidth, as does a bus selector 120. The buffer 110 processes the combined load of previous buffers A, B, C, and D, at four times the speed. A control circuit 122 coordinates the operations of the buffer, multiplexer and demultiplexer in response to signals from V and H control buses. As mentioned earlier, V and H bus controls are performed by passing R and G signals through the control buses, that is to say, the control of one data bus is completely independent from that of other data buses. Therefore, while one control circuit is shown to coordinate all the buses in this embodiment, control functions can be distributed in another embodiment. Arbitration for the higher speed V data bus has to deal with double the traffic load. This does not mean, however, that the control circuit has to run faster because, as shown in the aforementioned applicant's copending application, in the burst mode of ATM switching, performance in terms of cell delay is only a function of controller speed and the number of ports.

Figure 13:
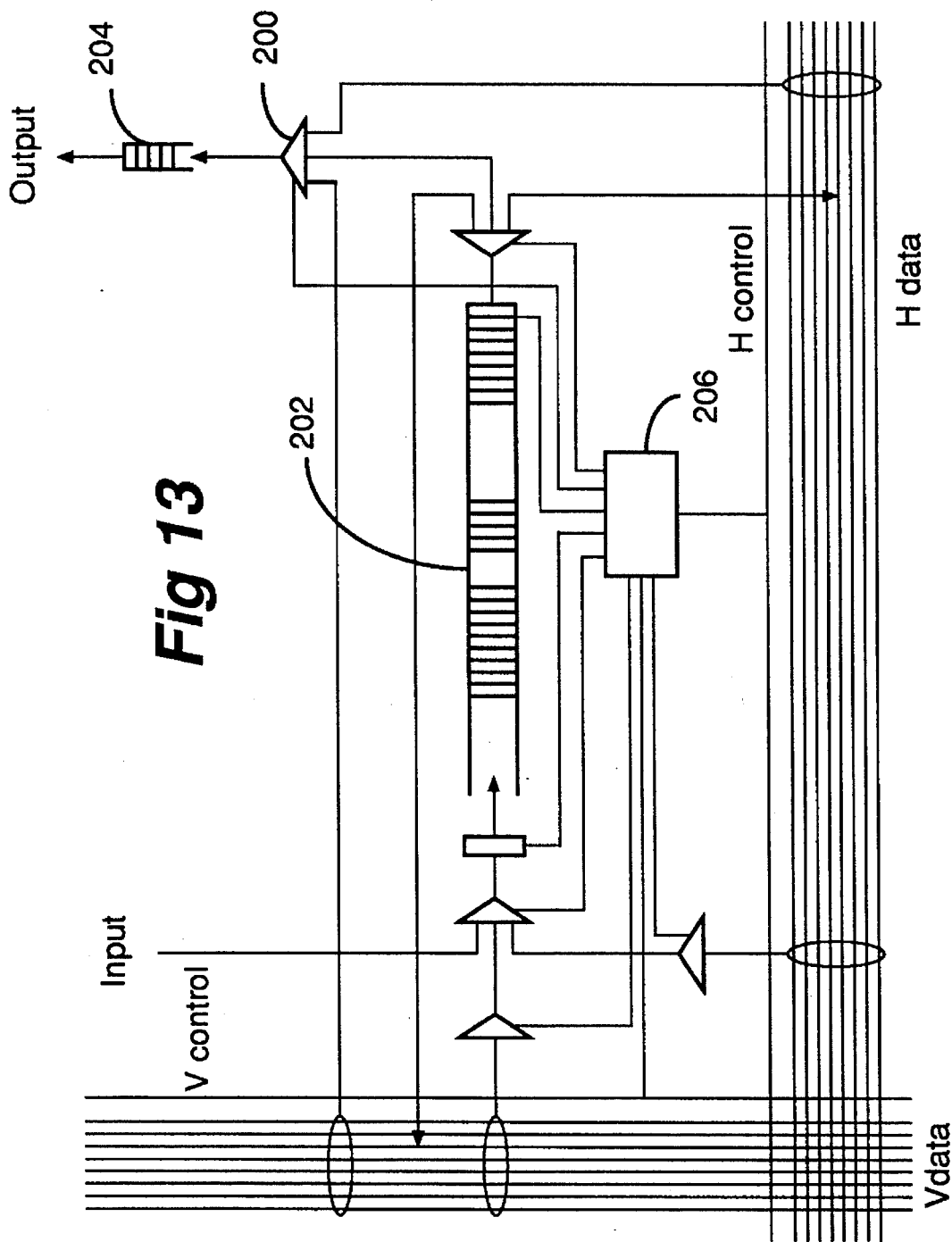
FIG. 13 is a buffer mechanism according to yet another embodiment of the invention.

FIG. 13 is yet another embodiment of the invention in which the speed of the buffer is reduced from that shown in FIG. 12. In this embodiment, an output link selector 200 is provided to pick up a signal from either V or H bus to drive the external output link without buffering. This is possible because when the buses run at the same speed as the output link, the external output signal need not be buffered at all. The selector drives the output link directly by selecting one of three sources, the node buffer 202 (for local or looparound traffic), and the two buses (for traffic from other nodes). Thus, the load on the buffer and its speed is significantly reduced. An output FIFO 204 is not a buffer but is provided for speed matching only in case bus speeds slightly vary from the output link speed, or for resynchronizing the cell flow and inserting idle cells where needed if the receiving peripheral cannot accept a signal made up of bursts with variable length guard times which may result from the space switching function. A control circuit 206 coordinates the H and V bus selection with the control of the output-link selector.

The single buffered configurations of FIGS. 12 and 13 permit further reduction of bus and buffer capacities because they provide an opportunity for routing signals more directly without going through four modules. In cases where modules are not in the same row or column, a module at the intersection of the two is employed as a tandem module. For every such input-output pair, there are two tandem modules available. The bus and buffer capacity of the matrix in FIG. 13 as a whole is reduced since the number of buses and buffers a signal has to traverse is less than the implementation shown in FIG. 12.

It should also be clear from the embodiments shown in FIGS. 12 and 13 that the traffic entering at the external input of a module can be routed either to H data bus first and then to V data bus, or V data bus first and then to H data bus. According to one embodiment therefore, it can be arranged, for example, that each module routes approximately half its traffic to the H data bus first and the remaining modules route their traffic to the V data bus first.

Figure 14:
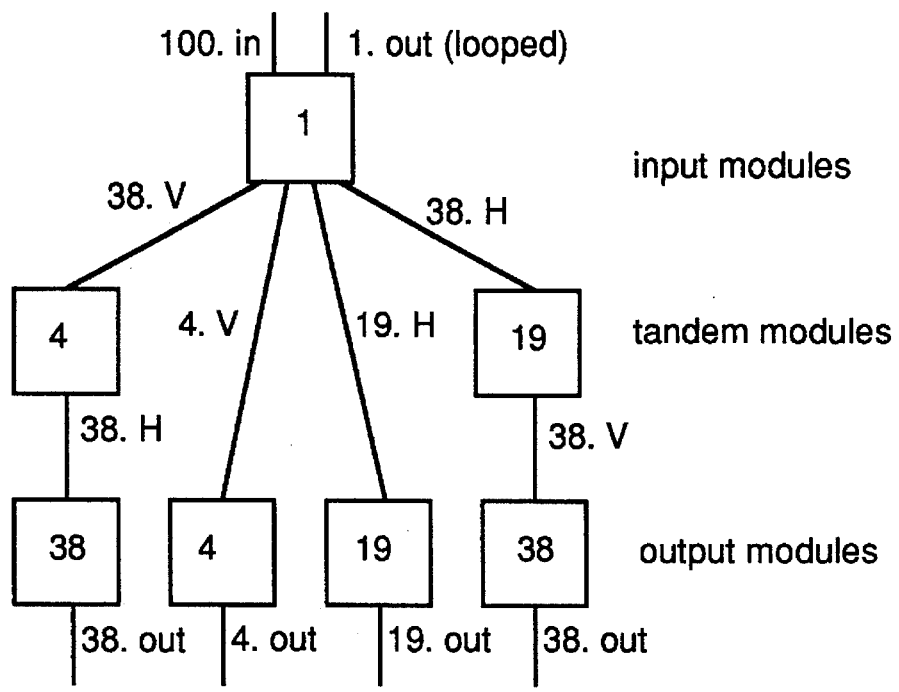
FIGS. 14 and 15 are charts showing the traffic distribution among modules.

FIG. 14 shows how the traffic entering a single module is split and can be used to calculate how the bus and buffer capacity can be reduced. To simplify the arithmetic, a 100 module matrix is considered. This is taken as a 5 by 20 matrix, rather than a 10 by 10 arrangement for two reasons, one to show clearly the feature of the invention that the matrix need not be square, and secondly because a switch architecture might be matched to its physical realization of the rectangular configuration for practical reasons (e.g., 4 shelves of 16 modules each). The total traffic entering a single module is 100%. Of this, 1% leaves the same module, assuming peripherals do not have intra-switching. The 99% remaining traffic is assumed evenly split over the 99 destination modules of the 5 by 20 matrix. Four percent can reach the 4 vertically adjacent modules directly via the vertical bus. Another 19% can reach 19 modules directly over the horizontal bus. The remaining 76% may be split 38 and 38 to tandem through tandem modules (it does not matter which, precisely). Thus another 38% of the traffic leaves the input module via each of the horizontal and vertical buses.

The module that is the input module for one connection can be a tandem module for other connections or can be an output module as well. FIG. 14 shows a module in all of these roles simultaneously.

Figure 15:
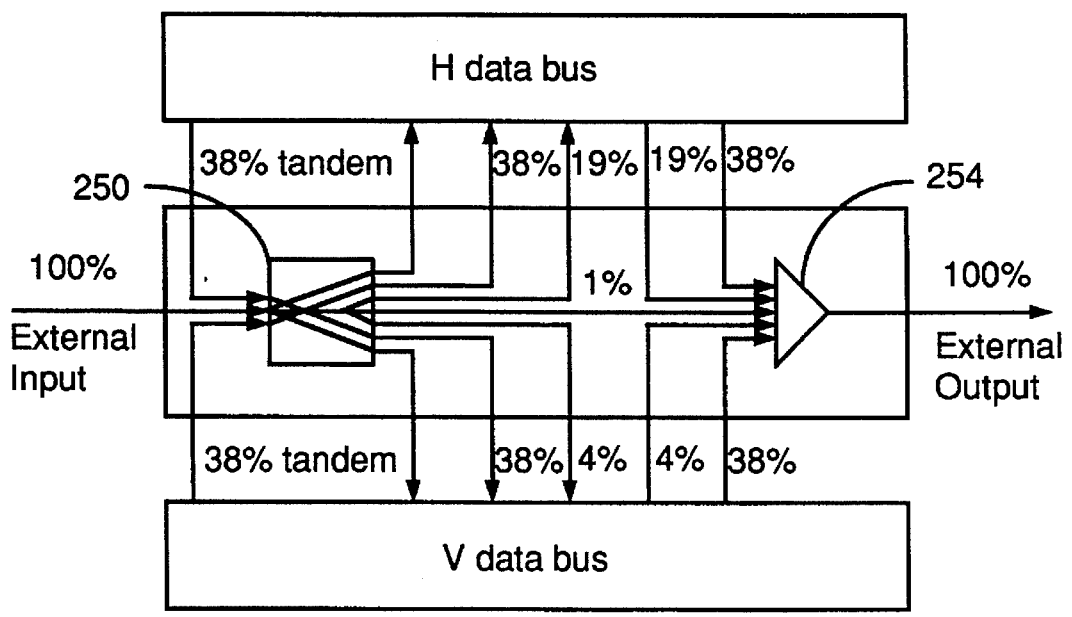

FIG. 15 shows a distribution of a module's total traffic flow in the configuration of FIG. 13. Traffic entering a crosspoint module always enters the buffer (202 in FIG. 13; 250 in FIG. 15) through a combined selector and multiplexer. As a tandem module, its buffer also picks up the other signals under the request and grant regime from the intersecting H and V buses (38% from each bus). The output of the buffer is steered towards one of three destinations, the associated H and V buses (19 and 4% respectively), and the output selector (1%) (200 in FIG. 13; 254 in FIG. 15). The H and V buses, of course, carry tandem traffic (38% each) which is also picked up by the output selector. The output selector in turn selects, again under the request and grant regime, traffic from three sources for transmission to the external module output.

As shown in FIG. 15, the total buffer throughput is 176%, just under 2 times the I/O link speed. Similarly, the bus speed (per segment) can be 95% and 80% of the link speed for the H and V buses respectively. By changing the aspect ratio of the H-V rectangle, the two required bus capacities can be adjusted. For example, a square matrix will require equal bus capacities, both less than the link speed, hence a bus speed equal to the link speed provides sufficient capacity over a range of aspect ratios.

What is claimed is:

1. A large capacity modular ATM switch for exchanging data in ATM cells among I/O ports, comprising:

a plurality of switching modules arranged in a logical m×n matrix, m and n being positive integers, each switching module having an I/O port, a buffer, bus selector means and a control circuit;

H data buses separately connecting modules in each separate row of the matrix to send data to all the modules in each row;

V data buses separately connecting modules in each separate column of the matrix to send data to all the modules in each column;

H and V control buses connecting modules in rows and columns to exchange control signals among the module control circuits;

the bus selector means of each module connected to the H and V data buses for selectively receiving data therefrom in response to the control signals on the H and V control buses;

the buffer connected to both data buses for storing one or more ATM cells in transit between the I/O ports; and the control circuits for generating the control signals in response to the state of the buffer.

2. The high capacity modular ATM switch according to claim 1, in which there are any number less than or equal to m×n switch modules in the matrix.

3. The high capacity ATM switch according to claim 2, in which the control signals comprise a connection request and a connection grant, and the data are exchanged in a train of a variable number of ATM cells among switch modules in response to the connection request and connection grant.

4. A large capacity modular ATM switch for exchanging data in ATM cells among I/O ports comprising:

a plurality of switching modules arranged in a logical m×n matrix, m and n being positive integers, each switching module having an I/O port, an input and output buffer and an intermediate buffer, H and V bus selector means and a control circuit;

H data buses, each H data bus connecting modules in each row of the matrix to send data to all the modules in the row;

V data buses, each V data bus connecting modules in each column of the matrix to send data to all the modules in the column;

H control buses, each H control bus connecting modules in each row of the matrix;

V control buses, each V control bus connecting modules in each column of the matrix;

each of the H and V bus selector means of each module connected to respective H and V data buses for receiving data therefrom in response to control signals on the respective control buses;

the intermediate buffer connecting respectively between the V bus selector means and H data bus;

the input buffer of each module sending data to the V data bus, the output buffer of each module receiving data from the H bus selector means which is connected to the H data buses; and the control circuits for generating the control signals in response to the state of the buffers.

5. The high capacity ATM switch according to claim 4, in which there are any number less than or equal to m×n switch modules in the matrix.

6. The high capacity ATM switch according to claim 5, in which the input buffer, output buffer and intermediate buffers are portions of a single memory; and each H and V data bus comprises a plurality of data bus lines in that each buffer drives one of the plurality of bus lines, the bus selector means is connected to all the bus lines but only selects one bus line from which it receives data in response to the control signal.

7. The high capacity ATM switch according to claim 6, in which V and H data buses comprise fiber optics, optical splitters and fiber optic shuffle boxes connecting the fiber optics and optical splitters.

8. The high capacity ATM switch according to claim 7, in which the control signals comprise a connection request and a connection grant, and the data are exchanged in a train of a variable number of ATM cells among I/O ports in response to the connection request and connection grant.

9. The high capacity ATM switch according to claim 6, in which V and H data buses comprise fiber optics for carrying wavelength division multiplexed beams, wavelength selective filters, and fiber optic shuffle boxes connecting the fiber optics and the wavelength selective filters.

10. A large capacity modular ATM switch for exchanging data in ATM cells among I/O ports comprising:

a plurality of switching modules arranged in a logical m×n matrix, m and n being positive integers, each switching module having an I/O port, a buffer, bus selector means and a control circuit;

H data buses separately connecting modules in each separate row of the matrix to send data to all the modules in each row;

V and W data buses, each separately connecting modules in each separate column of the matrix to send data to all the modules in each column;

H, V and W control buses connecting modules in rows and columns to exchange control signals among the module control circuits;

the bus selector means of each module connected to H, V and W data buses for selectively receiving data therefrom in response to the control signals on the H, V and W control buses;

the buffer connected to one of the data buses for storing one or more ATM cells in transit between the I/O ports; and the control circuits for generating the control signals in response to the state of the buffer.

11. The high capacity ATM switch according to claim 10, in which there are any number less than or equal to m×n switch modules in the matrix.

12. The high capacity ATM switch according to claim 11, in which the control signals comprise a connection request and a connection grant, and the data are exchanged in a train of a variable number of ATM cells among I/O ports in response to the connection request and connection grant.

13. A large capacity modular ATM switch for exchanging data in ATM cells among I/O ports comprising:

a plurality of switching modules arranged in a logical m×n matrix, m and n being positive integers, each switching module having an I/O port, an input and output buffer and intermediate buffers, H, V and W bus selector means and a control circuit;

H data buses, each H data bus connecting modules in each row of the matrix to send data to all the modules in the row;

V and W data buses, each V or W data bus connecting modules in each column of the matrix to send data to all the modules in the column;

H control buses, each H control bus connecting modules in each row of the matrix;

V and W control buses, each V or W control bus connecting modules in each column of the matrix;

each of the H, V and W bus selector means of each module connected to respective H, V and W data buses for receiving data therefrom in response to control signals on the respective control buses;

the intermediate buffers connecting between the V bus selector means and H data buses and between the H bus selector means and W data buses;

the input buffer of each module sending data to the V data buses, the output buffer of each module receiving data from the H bus selector means which is connected to the H data buses; and the control circuits for generating the control signals in response to the state of the buffer.

14. The high capacity ATM switch according to claim 13, in which there are any number less than or equal to m×n switch modules in the matrix.

15. The high capacity ATM switch according to claim 14, in which the input buffer, output buffer and intermediate buffers are portions of a single memory; and each H, V and W data buses comprises a plurality of data bus lines in that each buffer drives one of the plurality of bus lines, the bus selector means monitors all the bus lines but only selects one bus line from which it receives data in response to the control signal.

16. The high capacity ATM switch according to claim 15, in which V, H and W data buses comprise fiber optics, optical splitters and fiber optic shuffle boxes connecting the fiber optics and optical splitters.

17. The high capacity ATM switch according to claim 16, in which a multiplexer and demultiplexer are connected to the single memory, the V data buses are faster in speed than the H data buses and function as the V and W data buses in cooperation with the multiplexer and demultiplexer.

18. The high capacity ATM switch according to claim 17, in which the control signals comprise a connection request and a connection grant, and the data are exchanged in a train of a variable number of ATM cells among I/O ports in response to the connection request and connection grant.

19. The high capacity ATM switch according to claim 15, in which a multiplexer and demultiplexer are connected to the single memory, the V data buses are faster in speed than the H data buses and function as the V and W data buses in cooperation with the multiplexer and demultiplexer.

20. The high capacity ATM switch according to claim 19, in which the control signals comprise a connection request and a connection grant, and the data are exchanged in a train of a variable number of ATM cells among I/O ports in response to the connection request and connection grant.

21. The high capacity ATM switch according to claim 15, in which V, H and W data buses comprise fiber optics for carrying wavelength division multiplexed beams, wavelength selective filters, and fiber optic shuffle boxes connecting the fiber optics and the wavelength selective filters.

* * * * *